US009837004B2

(12) United States Patent
Rayhanian

(10) Patent No.: US 9,837,004 B2
(45) Date of Patent: *Dec. 5, 2017

(54) SLIPPERY SURFACE WARNING APPARATUS

(71) Applicant: Joseph Rayhanian, Beverly Hills, CA (US)

(72) Inventor: Joseph Rayhanian, Beverly Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/595,418

(22) Filed: May 15, 2017

(65) Prior Publication Data

US 2017/0287373 A1 Oct. 5, 2017

Related U.S. Application Data

(63) Continuation of application No. 13/565,806, filed on Aug. 3, 2012, now Pat. No. 9,653,009.

(51) Int. Cl.

| | |
|---|---|
| ***G01J 3/10*** | (2006.01) |
| ***G09F 23/06*** | (2006.01) |
| ***C11D 11/00*** | (2006.01) |
| ***G09F 15/00*** | (2006.01) |
| ***G09F 19/12*** | (2006.01) |
| ***G09F 19/22*** | (2006.01) |
| *G09F 13/22* | (2006.01) |

(52) U.S. Cl.
CPC .......... *G09F 23/06* (2013.01); *C11D 11/0023* (2013.01); *G09F 15/0062* (2013.01); *G09F 19/12* (2013.01); *G09F 19/22* (2013.01); *G09F 2013/222* (2013.01)

(58) Field of Classification Search
CPC ........................................................ G09F 23/06
USPC ...... 250/504 R; 362/184, 225, 253, 368, 800
See application file for complete search history.

(56) References Cited

U.S. PATENT DOCUMENTS

| | | | | |
|---|---|---|---|---|
| 9,653,009 B2 * | 5/2017 | Rayhanian | .............. | G09F 23/06 |
| 2006/0121166 A1 * | 6/2006 | Jeckle | .................... | A01K 85/00 426/395 |
| 2007/0291473 A1 * | 12/2007 | Traynor | ................. | A01K 11/00 362/106 |

* cited by examiner

*Primary Examiner* — David Porta
*Assistant Examiner* — Meenakshi Sahu
(74) *Attorney, Agent, or Firm* — Avyno Law P.C.

(57) ABSTRACT

An apparatus for warning a slippery surface is provided that includes a light emitting device, a mounting unit and a light-refracting liquid or powder to be added to a cleaning solution or other fluid causing a slippery surface. The apparatus is used for the purpose of alerting people in the vicinity of a potential safety hazard of the existence of such safety hazard. The light emitted from the light emitting device is directed toward the slippery surface imbued with light-refracting liquid or powder for the purpose of showing persons the existence of a slippery surface or hazardous condition.

20 Claims, 5 Drawing Sheets

SLIPPERY SURFACE WARNING APPARATUS

CROSS-REFERENCE TO RELATED APPLICATIONS

This application is a continuation-in-part of, and claims priority to, U.S. application Ser. No. 13/565,806, filed on Aug. 3, 2012, titled SLIPPERY SURFACE WARNING APPARATUS, which application is incorporated by reference in this application in its entirety.

BACKGROUND OF THE INVENTION

1. Field of the Invention

The present invention relates to safety equipment and a method for warning of a potential safety hazard, and more particularly, is a warning apparatus and method for alerting people in the vicinity of a slippery surface of such potential safety hazard.

2. Related Art

In virtually every business, most notably businesses with visiting customers or clients, it is incumbent upon the employees to maintain the floors and other surfaces in a professional manner. This means that floors have to be cleaned and sanitized daily, and oftentimes, several times a day depending upon the amount of foot traffic. In addition, to keep up appearances, some floors may have to be waxed, buffed, and treated with various chemicals, several of which may be in fluid form.

To this end, many businesses, or even property management corporations with condominiums and apartments task their employees with the assignment of polishing, cleaning, or otherwise treating various surfaces such as floors. One example is a retail or service location open for business 24 hours per day, such as various grocery stores, or fitness gym establishments. On occasion, various treatments must be made to the floors or other surfaces, which may create a hazardous condition on the floor. And although the employee may be able to warn a patron of the condition himself, there may be times when the patron may be out of his or her line of sight (e.g., her back is to the patron).

Additionally, one of the greatest concerns of any retail store such as a grocery store, or the like, is the danger of slip and fall litigation. Each year, many store customers wind up slipping on slippery surfaces in various aisles at a time before an employee can clean up slippery surface and/or make the premises safe for customers. Oftentimes, these slippery surfaces come from leaking beverage containers or other liquid filled containers, which may have been punctured in transit, or through the handling of either employees or customers.

For these reasons, many lawsuits are filed each year, which engenders an extraordinary expense to brick and mortar based industries. As a result, these stores have been required to carry various insurance policies, which charge hefty premiums.

To mitigate exposure, many restaurants and stores have implemented 15 to 30 minute sweep checks, which require employees to sweep the floor on all the aisles and to keep a lookout for dangerous slippery surfaces. And when an employee spots a slippery surface, they must immediately stop what they are doing and find a mop, sign, etc. to make sure no one gets hurt.

Unfortunately, there may be times when an employee may not be able to sufficiently remove the fluids from the floor immediately. This may be due to the relative toxicity of the fluids, or perhaps the existence of additional slippery surfaces elsewhere. And in the case where the fluids are transparent, their opacity lends itself to an even greater safety threat.

Therefore, a need exists for a system that will alert persons to where a dangerous slippery surface exists and precisely the borders of that slippery surface.

SUMMARY

A method and apparatus for warning of a slippery surface is provided. In one implementation, the apparatus features a light emitting device, a mounting unit for supporting and elevating the light emitting device, and a light-refracting liquid or powder to be added to a cleaning solution or other fluid. Through the use thereof, light emitted from the light emitting device is directed to the slippery surface imbued with light-reflecting cleaning solution for the purpose of showing persons where a slippery surface or hazardous condition exists.

Other devices, apparatus, systems, methods, features and advantages of the invention are or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention.

DETAILED DESCRIPTION

Figure 1:
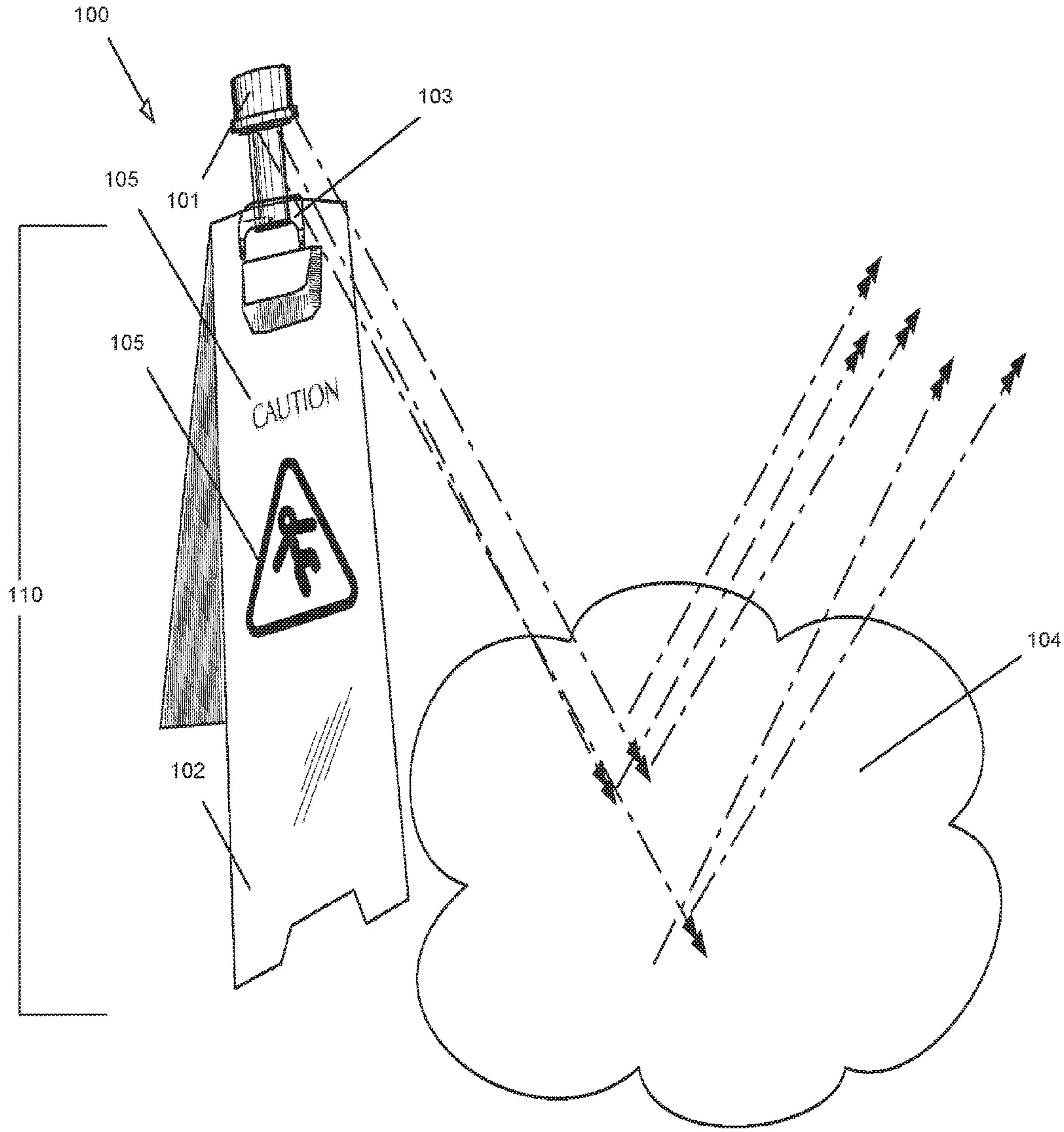
FIG. 1 is a perspective view of one example of an implementation of the apparatus in accordance with the present invention.

FIG. 1 illustrates one example of an implementation of the slippery surface warning apparatus 100 that includes a light emitting device 101, a mounting unit 110, including a sign 102 and a mount 103, and a light-refracting liquid or powder to be added to a cleaning solution or other fluid 300 (FIG. 3) to a slippery surface or hazardous condition 104. The light emitting device 101 is used for the purpose of illuminating the slippery surface or hazardous condition 104 in which people walk.

In one example of an implementation, the light emitting device 101 may be affixed to mounting unit 110, which in FIG. 1 is mount 103, which is affixed to the sign 102. The light emitting device 101 may contain an LED light source. It should be noted that other light sources known in the art may be incorporated into the light emitting device, including but not limited to, fluorescent, compact fluorescent, incandescent, or halogen light sources. As such, the aforementioned example should not be construed as limited to only the utilization of LED emitting devices. The light emitting device 101 may emit any light or radiation in all directions (360°) or in one or more directions.

The light-refracting liquid or powder 300 (FIG. 3) that is added to the cleaning solution or other fluid is responsive to the wavelength of the light that is emitted from the light emitting device 101. It should be noted that the type of light that is emitted from the light emitting light source 101 may include any light within the light reflecting spectrum that is able to refract or reflect off the light-refracting liquid or powder 300 to illuminate a slippery surface or hazardous condition. The light reflecting spectrum includes ultra-violet light, visible light and infrared light. The wavelength of the light reflecting spectrum that is emitted may have a range between approximately 100 nm-1 mm (ultra-violet light has a wavelength range of approximately 100 nm-400 nm, visible light has a wavelength range of approximately 400 nm-780 nm, and infrared light has a wavelength range of approximately 780 nm-1 mm). Accordingly, the light-refracting liquid or powder 300 that is added to the cleaning solution or other fluid is capable of reflecting the type of light and wavelength that is emitted from the light emitting light source 101. Thus, the type of light that can be reflected by the light-refracting liquid or powder 300 may include the light reflecting spectrum or any light therein, such as ultra-violet light, visible light, or infrared light.

For example, the light emitting device 101 may emit a ultra-violet light at a wavelength of 350 nm. The light-refracting liquid or powder 300 that is added to the cleaning solution or other fluid is then capable of reflecting the ultra-violet light that is emitted from the light emitting light source 101 such that the reflection can be visibly seen by a person or patron. In another example, the light emitting device 101 may emit royal blue visible light at a wavelength of 440 nm-465 nm. The light-refracting liquid or powder 300 that is added to the cleaning solution or other fluid is then capable of reflecting the royal blue visible light that is emitted from the light emitting light source 101 such that the reflection can be visibly seen by a person or patron. Moreover, the light emitting device 101 may have a flash light setting or strobe light setting. In some implementations, the light emitting device 101 may operate on rechargeable batteries.

As shown in FIG. 1, the mount 103 may attach to the sign 102. The sign 102 may be used to elevate the light emitting device 101 above the slippery surface and/or to provide another means of warning of the hazardous condition. The mount 103 may be used for the purpose of affixing the light emitting device 101 to the sign 102. The mount 103 can attach to the sign 102 by, for example, a clip, a clamp, a fastener, adhesive, or any other securing mechanism known in the art. The light emitting device 101 and mount 103 may be attached to a variety of different signs, having various different shapes or sizes. In one example, the sign 102 may have indicia 105, which may include warnings in the form of words or images regarding a slippery surface or other hazardous condition to notify shoppers or other people of the hazardous condition. Moreover, in some implementations, the sign 102 can be a sandwich board style frame. In another example, the light emitting device 101 may also be integrated into the sign 102 rather than being attached to the sign 102 as a separate component. The light emitting device 101 may also be integrated or built into the structures of walls or buildings.

Figure 2:
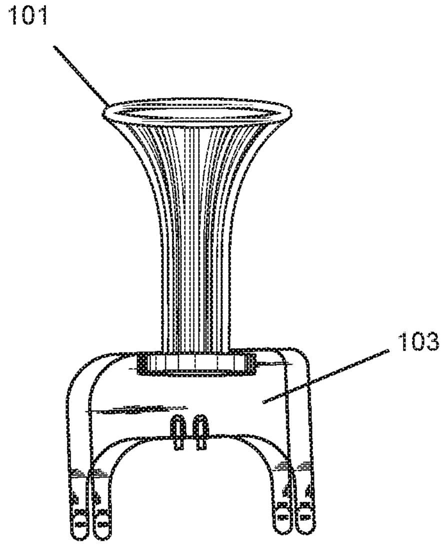
FIG. 2 is a perspective view of one example of an implementation of a light emitting device engaged with a mounting assembly.

FIG. 2 illustrates one example of an implementation of a light emitting device 101 affixed to a mount 103. The light emitting device 101 may be affixed to the mount 103 by any fastening or securing mechanism. The mount 103 may itself be a clip, a clamp, a fastener, adhesive, or any other securing mechanism known in the art for securing the light emitting device 101 to another object for the purposes of supporting the light emitting device 101. In one example, the light emitting device 101 may be contoured.

Figure 3:
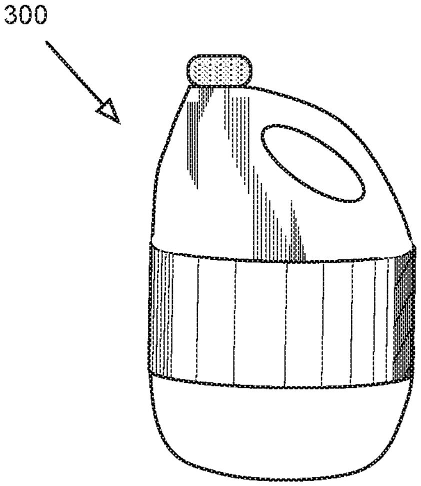
FIG. 3 is a perspective view of a container holding light-refracting liquid or powder.

FIG. 3 illustrates a container holding light-refracting liquid or powder 300 that may be added to the cleaning solution or other fluid cause the slippery or hazard condition. The light-refracting liquid or powder 300 to be added to a cleaning solution or other fluid is used for the purpose of showing persons within the vicinity of the slippery surface or hazardous condition where the slippery surface or hazardous condition is located. In one example, the light-refracting liquid or powder 300 may also include a cleaning solution, such as a combination of water and cleaning soap, for purposes of cleaning the surface.

As stated above, the light-refracting liquid or powder 300 may have the ability to reflect a wide range of light, including but not limited to ultra-violet light, visible light, and infrared light, or to only reflect certain types of light within the light reflecting spectrum, including, but not limited to, ultra-violet light and royal blue light. The primary use of the fluid is to highlight the peripheral boundaries of the fluid on the ground in a clear, unmistakable, and loud fashion, which is attention-grabbing. Also, the light-refracting liquid or powder 300 may be added to a cleaning solution or other fluid, which is imbued into a slippery area on a surface.

In another example, the light refracting liquid or powder 300 is used to make a fluorescent solution which comprises water, cleaning soap (option), and fluorescent chemicals (in the form of dyes, powders, fluids, etc.). In another example, the light-refracting liquid or powder 300 may be fluorescent in nature. However, other examples, may utilize other similar compounds which achieve the same effect.

Figure 4:
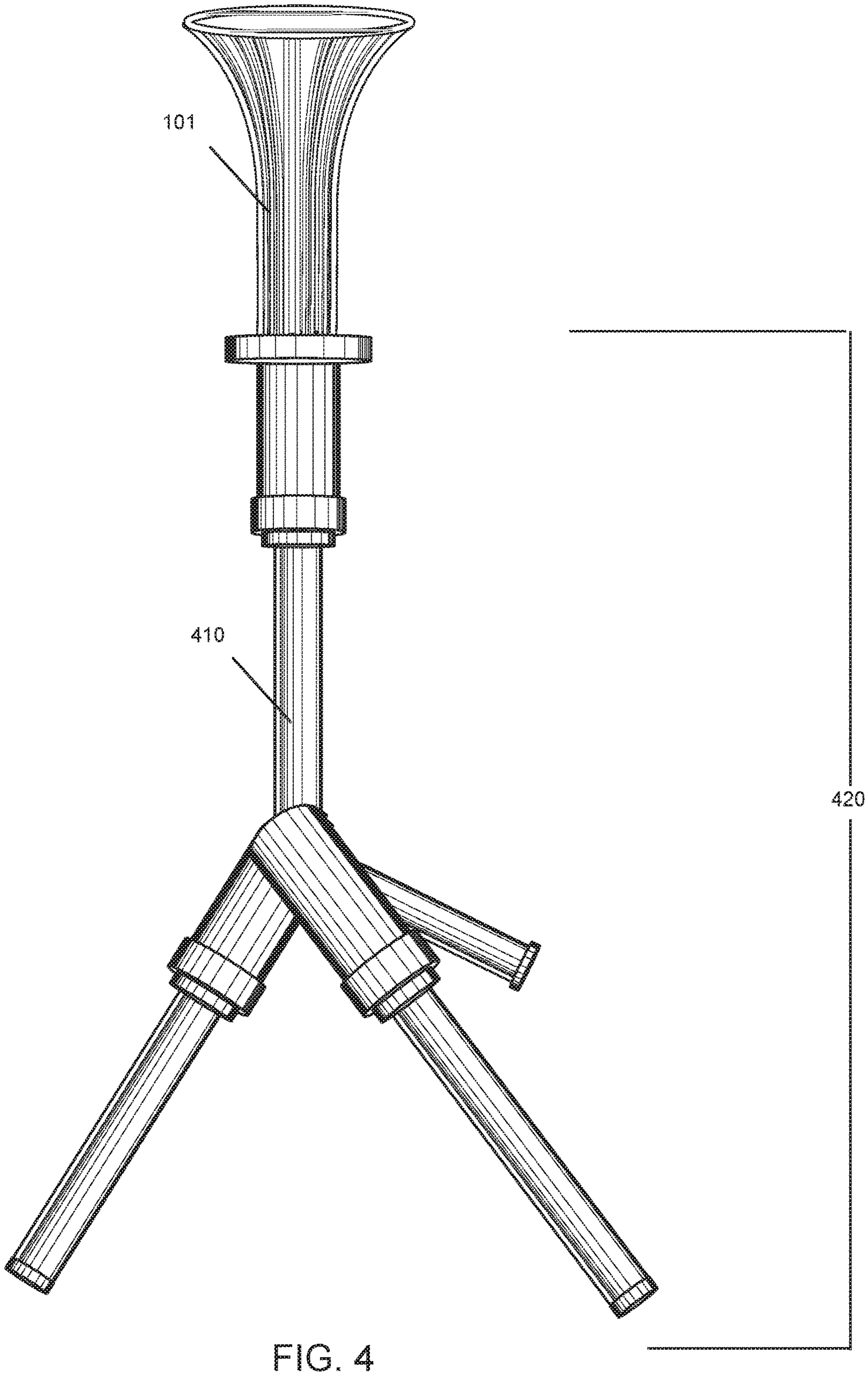
FIG. 4 is a perspective view of one example of an implementation of a light emitting device mounted to a tri-pod mounting assembly.

FIG. 4 is a perspective view of one example of an implementation of a light emitting device 101 mounted to a tri-pod mounting assembly 410. In this example, the mounting unit 420 is a tri-pod mounting assembly 410 for supporting the light emitting device 101. However, other similar mounting units 420 may be used interchangeably with the tri-pod apparatus 410.

Figure 5:
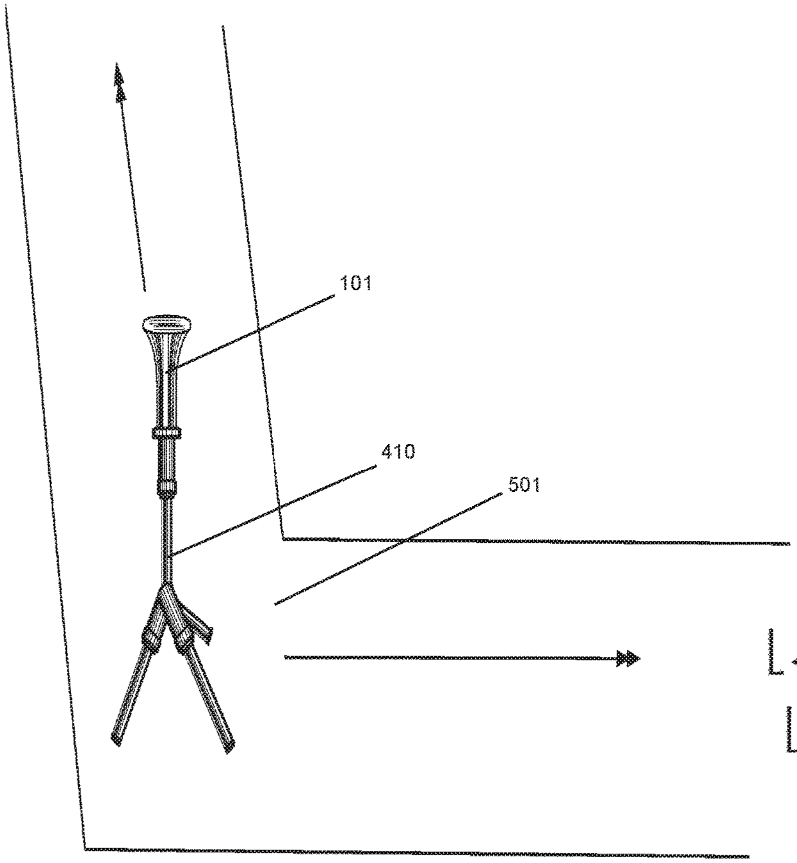
FIG. 5 is a perspective view of one example of an implementation of a light emitting device mounted on a tri-pod apparatus located on a corner walkway.
Figure 6:
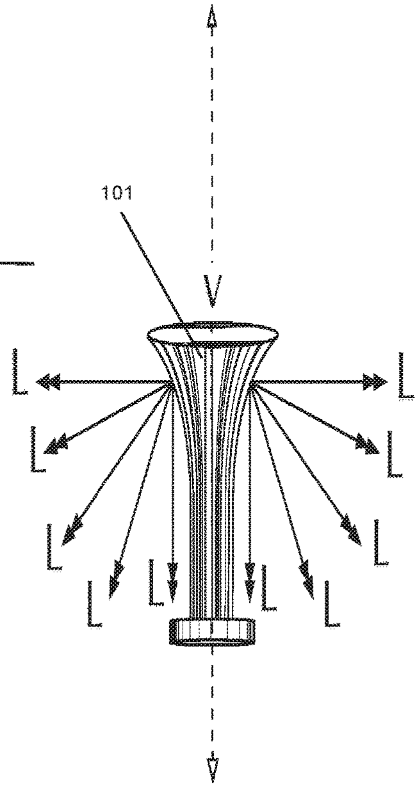
FIG. 6 is an elevated view of an implementation of a light emitting device emitting light in a variety of different directions.

FIG. 5 and FIG. 6 illustrate the angles in which the light emitting device 101 may emit light. FIG. 5 shows a light emitting device 101 mounted on a tri-pod apparatus 410 that is located in a corner of a walkway 501. The light emitting device 101 is shown to emit light in two different directions of the walkway. In other examples, the light emitting device 101 may be adjusted such that it emits light in any direction where the light is desired.

FIG. 6 illustrates the light emitting device 101 structured in such a way to emit light (L) 360° with respect to the vertical axis (V). The light emitting device 101 may also emit light in one or more concentrated directions if desired.

Figure 7:
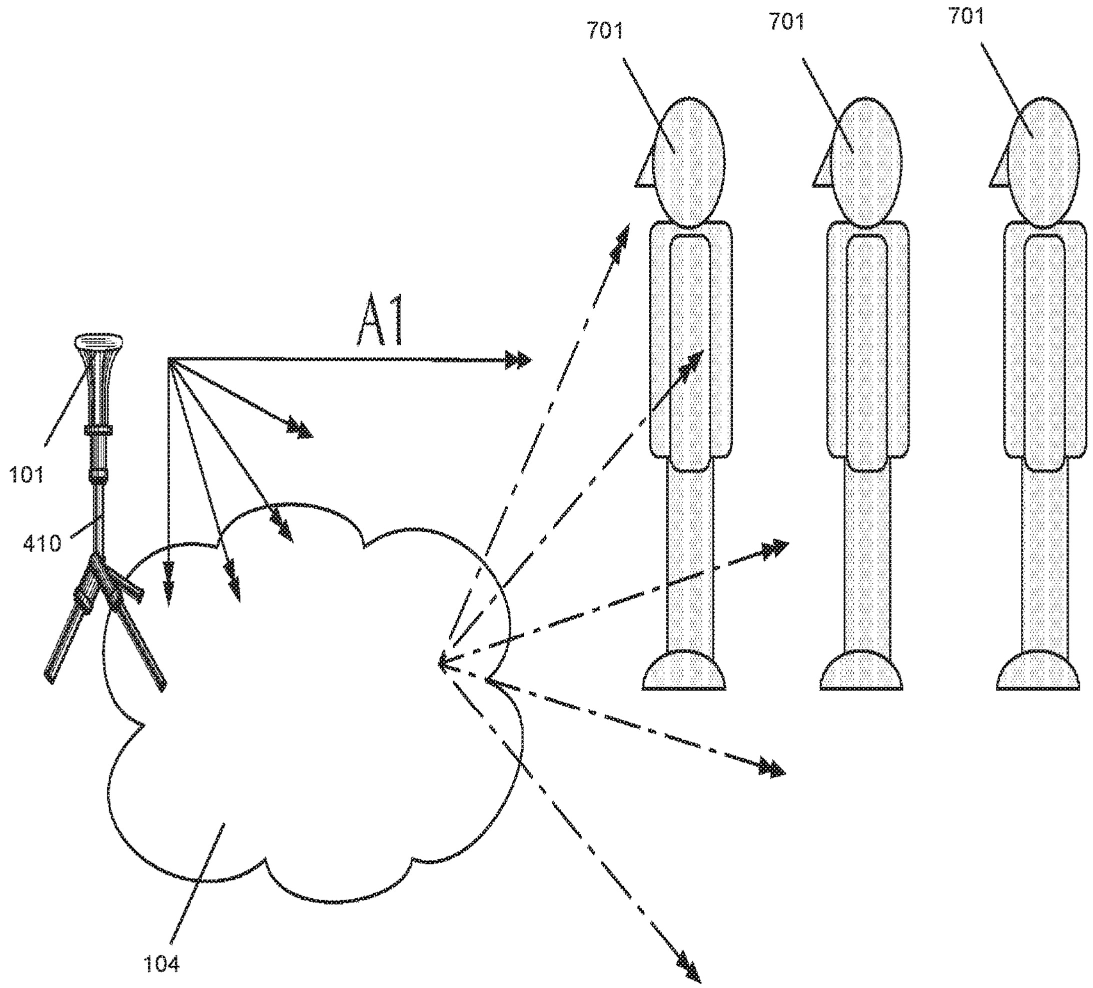
FIG. 7 is a perspective view of an implementation of a light emitting device emitting light at angles relative to persons.

FIG. 7 illustrates the light emitting device 101 mounted on a tri-pod apparatus 410 at a height lower than the eye-level of a person 701. The light emitting device 101 light emissions are angled such that the highest angle of light rays (A1) does not directly reach the eye-level of a person 701.

Instead, the light rays are angled such that the light rays are reflected from the light-refracting liquid or powder 300 that is added to the cleaning solution or other fluid to a slippery surface or hazardous condition 104 in upwardly direction which does come into the person's line of sight. In other words, while light rays emitted from the light emitting device 101 does not reach the eye-level of a person 701 directly, the light rays that are reflected off of the light-refracting liquid or powder 300 added to a slippery surface or hazardous condition 104 do reach the eye-level of a person 701.

FIGS. 1-7 illustrate various ways in which the light emitting device 101 can be supported and elevated above a ground surface. For purposes of this application, any device that supports and elevates the light emitting device 101 may be known as a mounting unit. As seen in FIG. 1, the mounting unit 110 can be a sign 102, a mount 103, or any combination of a sign 102 and mount 103. Furthermore, as seen in FIG. 4, the mounting unit 420 may be a tri-pod apparatus 410 or any other structure that supports and elevates the light emitting device 101. A mounting unit may further include a mount 103 in combination with a tri-pod apparatus 106 or any other structure that supports and/or elevates the light emitting device 101. In some examples, the mounting unit may also be formed as part of the light emitting device 101 or may be a separate structure.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A slippery surface warning system for alerting people of a potential safety hazard on a surface in which the people walk, the warning system comprising:

a light emitting device;

a mounting unit for mounting the light emitting device on the unit; and a light-refracting substance for adding to a liquid, whereby the light-refracting substance, when added to a liquid imparts reflective properties on the liquid when illuminated by the light, for purposes of alerting people to a potential safety hazard.

2. The slippery surface warning system of claim 1, where the liquid is the safety hazard on the surface in which the people walk.

3. The slippery surface warning system of claim 1, where the liquid is a cleaning solution that is used on the surface in which the people walk to clean the surface.

4. The slippery surface warning system of claim 1, where the light-refracting substance is a liquid solution.

5. The slippery surface warning system of claim 1, where the light-refracting substance is a powder.

6. The slippery surface warning system of claim 1, where the mounting unit is a sign.

7. The slippery surface warning system of claim 1, where the mounting unit is a tri-pod.

8. The slippery surface warning system of claim 1, where the mounting unit is formed as part of the light emitting device.

9. The slippery surface warning system of claim 1, where the light emitting device includes light emitting diodes.

10. The slippery surface warning system of claim 1, where the mounting unit further includes a clamp for mounting the light emitting device.

11. The slippery surface warning system of claim 1, where the light emitting device emits ultra-violet light.

12. The slippery surface warning system of claim 1, where the light emitting device emits visible light.

13. The slippery surface warning system of claim 1, where the light emitting device emits infrared light.

14. The slippery surface warning system of claim 1, where the light-refracting substance reflects ultra-violet light.

15. The slippery surface warning system of claim 1, where the light-refracting substance reflects visible light.

16. The slippery surface warning system of claim 1, where the light-refracting substance reflects infrared light.

17. A method for alerting people of a potential safety hazard on a surface in which the people walk, the method comprising the steps of applying a light-refractive substance on the surface for purposes of identifying a safety hazard on the surface; and illuminating the surface by placing a light emitting device within a predetermined range of the surface and directing light toward the surface to permit the light to reflect off the light-refracting substance.

18. The method for alerting people of a potential safety hazard on a surface of claim 17, where the light-refractive substance is mixed with liquid on the surface.

19. The method for alerting people of a potential safety hazard on a surface of claim 17, where the light-refractive substance is mixed with a liquid cleaning solution that is then applied directly onto the surface.

20. The method for alerting people of a potential safety hazard on a surface of claim 17, where the light emitting device emits an ultra-violet light or a royal blue light and the light-refracting substance reflects the light.

* * * * *